United States Patent [19]
Kaneko et al.

[11] Patent Number: 6,107,360
[45] Date of Patent: Aug. 22, 2000

[54] ACTIVE RADIATION RAY CURABLE, SOLAR RADIATION BLOCKING RESIN COMPOSITIONS AND FILMS COATED THEREWITH

[75] Inventors: Shoichi Kaneko, Omiya; Hiroshi Sakurai, Iruma; Kaoru Izumi; Kenichiro Yoshioka, both of Yono, all of Japan

[73] Assignee: Nippon Kayaku Kabushiki Kaisha, Tokyo, Japan

[21] Appl. No.: 08/836,992

[22] PCT Filed: Sep. 27, 1996

[86] PCT No.: PCT/JP96/02827

§ 371 Date: Aug. 18, 1997

§ 102(e) Date: Aug. 18, 1997

[87] PCT Pub. No.: WO97/11975

PCT Pub. Date: Apr. 3, 1997

[30] Foreign Application Priority Data

| Sep. 29, 1995 | [JP] | Japan | 7-275044 |
| Oct. 17, 1995 | [JP] | Japan | 7-293295 |
| Nov. 14, 1995 | [JP] | Japan | 7-318503 |
| May 31, 1996 | [JP] | Japan | 8-159275 |
| May 22, 1996 | [JP] | Japan | 8-149766 |
| Jul. 26, 1996 | [JP] | Japan | 8-214022 |

[51] Int. Cl.$^7$ ............... C08J 3/28; C08K 3/18; C08K 3/22

[52] U.S. Cl. ............... 522/81; 522/74; 522/79; 522/80; 522/107; 522/182; 522/121; 523/135; 106/733

[58] Field of Search ............... 522/81, 75, 63, 522/65, 74, 79, 80, 107, 182, 121; 106/733; 523/135

[56] References Cited

U.S. PATENT DOCUMENTS

| 3,484,467 | 12/1969 | Susi et al. | 260/440 |
| 3,637,769 | 1/1972 | Susi et al. | 260/396 |
| 4,042,476 | 8/1977 | Collins et al. | 522/81 |
| 4,708,821 | 11/1987 | Shimokawa et al. | 512/12 |
| 4,770,812 | 9/1988 | Watanabe et al. | 252/309 |
| 4,770,813 | 9/1988 | Watanabe et al. | 252/309 |
| 5,429,846 | 7/1995 | Sugimoto et al. | 522/81 |
| 5,489,621 | 2/1996 | Sato et al. | 522/81 |
| 5,519,088 | 5/1996 | Itoh et al. | 522/81 |

FOREIGN PATENT DOCUMENTS

| 60-99173 | 6/1982 | Japan. |
| 58-117228 | 7/1983 | Japan. |
| 61-31476 | 2/1986 | Japan. |
| 62-112670 | 5/1987 | Japan. |
| 63-11519 | 1/1988 | Japan. |
| 2-105875 | 4/1990 | Japan. |
| 3-111480 | 5/1991 | Japan. |
| 3-229767 | 10/1991 | Japan. |
| 6-262717 | 5/1993 | Japan. |
| 6-17234 | 3/1994 | Japan. |
| 6-219743 | 8/1994 | Japan. |
| 7-41705 | 2/1995 | Japan. |
| 7-29773 | 4/1995 | Japan. |

OTHER PUBLICATIONS

PTO translation (10–98) of JP 06262717 A to Sumitomo Cement Co., Ltd., Sep. 1994.
PTO translation (10–98) of JP 07041705 A to Sekisui Chem. Co., Ltd., Feb. 1995.
PTO translation (10–98) of JP 03219743 A to Nissan Chem. Ind., Ltd., Aug. 1994.
PTO translation (10–98) of JP 6131476 A to Sekisui Chem. Co., Ltd., Feb. 1986.
Patent Abstracts of Japan vol. 096, NO. 001 & JP 07247306 A (Kureha Chem. Ind. Co. Ltd.), Sep. 26, 1995—Abstract.
Patent Abstracts of Japan vol. 095, No. 009 & JP 07 150078 A (Sekisui Chem. Ind. Co. Ltd.), Jun. 13, 1995—Abstract.
Patent Abstracts of Japan vol. 018, No. 528 & JP 06 184470 A (Hitachi Chem. Co. Ltd.), Jul. 5, 1994—Abstract.

*Primary Examiner*—Susan Berman
*Attorney, Agent, or Firm*—Nields, Lemack & Dingman

[57] ABSTRACT

This invention provides a resin composition which is cured by active radiation rays, shows less absorption in the visible light region, has solar radiation blocking ability and is excellent in scratch resistance, and a film coated with the resin composition. Said resin composition comprises solar radiation absorbable fine particles of a metal oxide such as zinc antimonate anhydride, tin oxide, ATO (antimony doped tin oxide), ITO (tin doped indium oxide) or the like and an active radiation ray polymerizable (meth)acrylate having a (meth)acryloyl group, and a coating obtained therefrom has excellent paint film hardness and scratch resistance.

3 Claims, 5 Drawing Sheets

ACTIVE RADIATION RAY CURABLE, SOLAR RADIATION BLOCKING RESIN COMPOSITIONS AND FILMS COATED THEREWITH

TECHNICAL FIELD

This invention relates to a solar radiation(heat wave or heat ray) blocking resin composition curable with active radiation rays such as ultraviolet rays and the like, which comprises solar radiation absorbable fine particles of an inorganic metal having a primary particle size of 0.5 $\mu$m or less and an active radiation ray polymerizable (meth) acrylate having a (meth)acryloyl group, and to scratch resistable films coated therewith.

Solar radiation blocking materials have been extensively researched and developed, particularly in recent years and can be used in photo-sensitive materials to semiconductor laser beam or the like rays having a wave length of the near infrared ray region as the light source, in information recording materials such as recording materials for photodisc and the like and in windows of buildings, car windows and the like as infrared cutting filters or solar radiation blocking films.

BACKGROUND ART

Chrome, cobalt complex salt thiol nickel complexes, anthraquinone derivatives and the like are known in the prior art as near infrared ray absorbable, light transmitting materials. Also known is a solar radiation reflecting film in which aluminum, copper or the like metal is vacuum-deposited on one surface of a polyethylene terephthalate film. Since such an infrared rays reflecting film well transmits visible rays but reflects near infrared—infrared rays, when applied to a glass of window or the like opening part of buildings, it exerts daylight controlling and heat insulating effects by reflecting solar radiation of the sun light or heat radiation from the interior of the room, keeping its transparency. Transparent, thermal insulation films having such characteristics are applied to windows of buildings, freezer-refrigerator show cases, thermal insulating surfaces, car windows and the like and useful for example in improving dwelling environment and saving energy.

However, solar radiation blocking materials of the prior art, when made solely of organic materials, have a disadvantage in that their initial properties are deteriorated as the environmental conditions change or with the lapse of time, due to their poor durability (weather resistance or the like). On the other hand, those which are made of complex materials have good durability, but they not only absorb rays of near infrared region spectra but also absorb visible region spectra and the compounds themselves are strongly colored, and thus their applications are limited.

Also, solar radiation reflecting films of the prior art reflect not only infrared rays but also visible rays by the metal deposited, thus posing a fatal disadvantage in that the interior of a room becomes dark when they are applied to window glass and the like. In addition, since a large apparatus is necessary to form such a deposited layer of metals, their production cost becomes high and their general use as final products therefore becomes limited.

In order to form a layer or coat of solar radiation absorbents, the solar radiation absorbing agents must be uniformly dispersed in resins. As binders of the resin, acrylic resin, polyester resin, alkyd resin, polyurethane resin, epoxy resin, amino resin, vinyl resin or the like thermoplastic resins are generally used. However, these resins to be used as the binder are apt to get flaws due to poor scratch resistance of the coated layer. In order to improve scratch resistance of these films to a practical level, it is desirable to carry out a hard coating treatment on the outer surface of reflecting film. However, such a process in which a solar radiation absorbing material is coated and then its outer surface is again subjected to hard coating leads to higher cost and poorer general use.

DISCLOSURE OF THE INVENTION

The inventors of the present invention have conducted intensive studies on a solar radiation blocking material which has an absorption at the near infrared—far infrared region, less coloring and excellent durability, and found that a solar radiation blocking resin composition curable with active radiation rays such as ultraviolet rays and the like, from which a coated film having excellent scratch resistance can be obtained by curing through the irradiation of ultraviolet rays and the like and yet by a single coating, can be obtained by dispersing fine particles of an inorganic metal, particularly fine particles of a metal oxide, having a primary particle size of 0.5 $\mu$m or less, preferably 0.1 $\mu$m or less, in a resin which is curable with ultraviolet rays and the like active radiation rays, thus resulting in the accomplishment of the present invention.

The present invention relates to a solar radiation blocking resin composition which is curable with active radiation rays such as ultraviolet rays and the like and gives excellent scratch resistance, which comprises solar radiation absorbable fine particles of an inorganic metal having a primary particle size of 0.5 $\mu$m or less and, as its binder, an active radiation ray polymerizable (meth)acrylate having a (meth) acryloyl group, and to films coated therewith.

BEST MODE OF CARRYING OUT THE INVENTION

Figure 1:
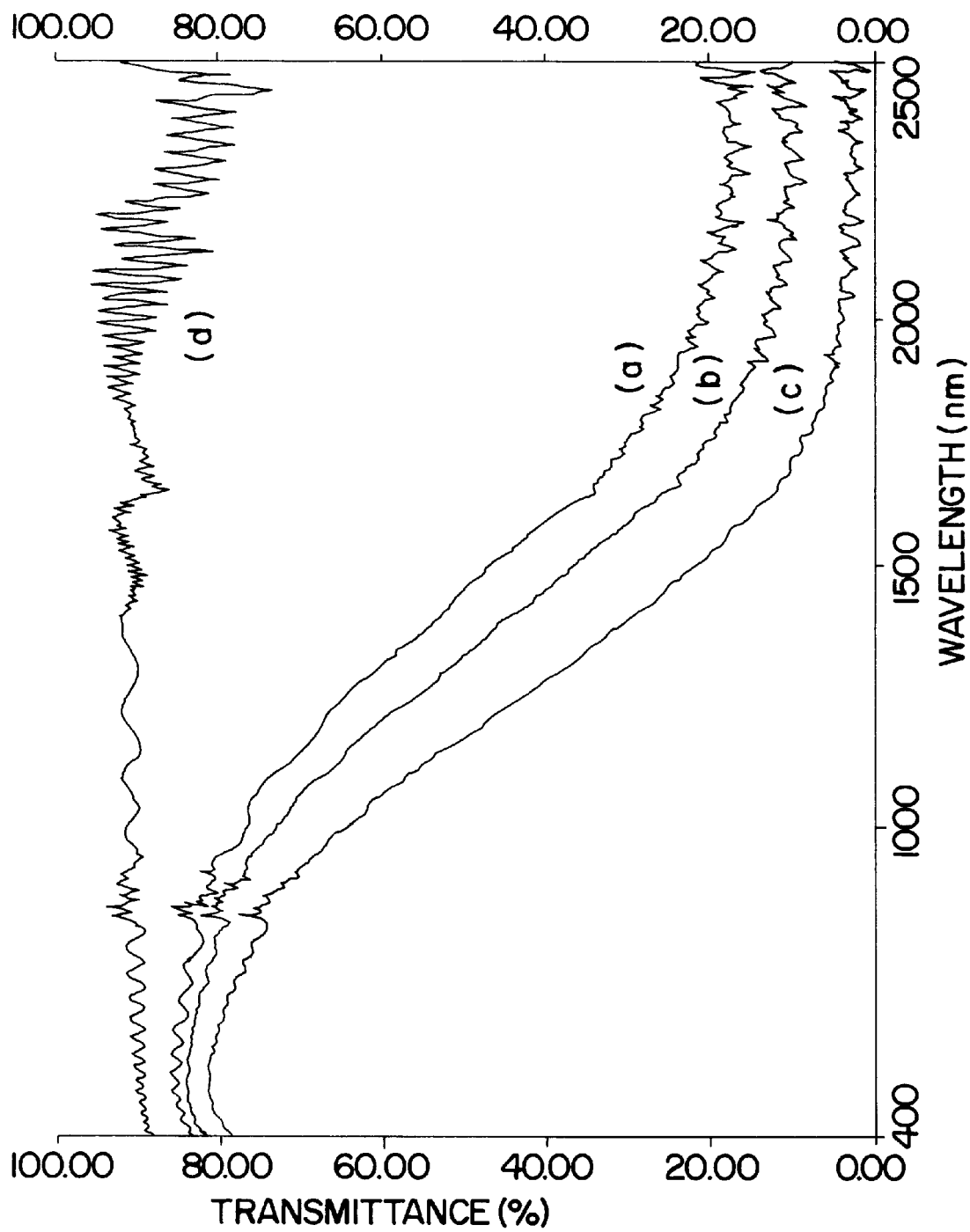
FIG. 1 is a graph showing spectral characteristics of the films (a) to (c) obtained by coating the resin composition of the present invention (Example 3) on polyester films and of an un-coated polyester film (d).

Examples of the metal having solar radiation absorption ability include titanium oxide, zinc oxide, vanadium oxide, indium oxide, tin oxide, antimony oxide, zinc sulfide and the like, and tin oxide, ATO (tin oxide antimony doped), ITO (tin oxide indium doped), zinc antimonate anhydride and the like metal oxides are particularly effective.

ATO can be produced for example by a method described in Japanese Patent Application Kokai No. 58-117228(1983) or Japanese Patent Application Kokai No. 6-262717(1994), and ITO for example by a method disclosed in Japanese Patent Application Kokai No. 63-11519(1988).

In addition, zinc antimonate anhydride sol (for example, Cellunax CX-Z ($ZnSb_2O_6$) manufactured by Nissan Chemical Industries) can also be used suitably in the present invention as a metal oxide having infrared ray absorption ability. Since zinc antimonate anhydride has an absorption at the ultraviolet region having shorter wave length than the visible region, its effect to improve light resistance can also be expected. In addition, since zinc antimonate anhydride has a function as a flame retarding agent derived from antimony pentaoxide, films obtained by its coating have flame resistance. Antimony pentaoxide can be produced for example by a method disclosed in Japanese Patent Publication Kokoku No. 6-17234(1994) or Japanese Patent Publication Kokoku No. 7-29773(1995), and zinc antimonate anhydride can be produced for example by a method disclosed in Japanese Patent Application Kokai No. 6-219743 (1994). Fine particles of the zinc antimonate anhydride can be obtained for example by mixing a zinc compound with colloidal antimony oxide, drying the mixture and then baking it at a high temperature.

It is desirable that these metal oxides are prepared in such a form that they can be dispersed in organic solvents. Also, in order to form a metal oxide-containing film which has less absorption at visible rays region and is transparent, it is necessary to make it into a fine particle having a primary particle size of 0.5 μm or less, preferably 0.1 μm or less. Amount of the solar radiation absorbable inorganic metal contained in the resin composition of the present invention can be set to any values depending on the required solar radiation blocking efficiency, but these particles should be dispersed stably in the resin without aggregation.

The active energy ray polymerizable (meth)acrylate to be used in the present invention can be selected from (meth)acrylates which have at least one (meth)acryloyl group in the molecule and are curable with ultraviolet beams or electron beams, which may be used alone or as a mixture. Illustrative examples of the (meth)acrylate include, though not particularly limited to, 2-hydroxyethyl (meth)acrylate, 2-hydroxypropyl (meth)acrylate, isobutyl (meth)acrylate, t-butyl (meth)acrylate, 2-ethylhexyl (meth)acrylate, stearyl acrylate, 2-ethylhexylcarbitol acrylate, ωcarboxypolycaprolactone monoacrylate, acryloyloxyethylic acid, acrylic acid dimer, lauryl (meth)acrylate, 2-methoxyethyl acrylate, butoxyethyl acrylate, ethoxyethoxyethyl acrylate, methoxytriethylene glycol acrylate, methoxypolyethylene glycol acrylate, stearyl (meth)acrylate, cyclohexyl (meth)acrylate, tetrahydrofurfuryl (meth)acrylate, isobornyl (meth)acrylate, dicyclopentenyl acrylate, benzyl acrylate, phenyl glycidyl ether epoxyacrylate, phenoxyethyl (meth)acrylate, phenoxy (poly)ethylene glycol acrylate, nonylphenol ethoxylated acrylate, acryloyloxyethylphthalic acid, tribromophenyl acrylate, tribromophenol ethoxylated (meth)acrylate, methyl methacrylate, tribromophenyl methacrylate, methacryloyloxyethylic acid, methacryloyloxyethylmaleic acid, methacryloyloxyethylhexahydrophthalic acid, methacryloyloxyethylphthalic acid, polyethylene glycol (meth)acrylate, polypropylene glycol (meth)acrylate, β-carboxyethyl acrylate, N-methylol acrylamide, N-methoxymethyl acrylamide, N-ethoxymethyl acrylamide, N-n-butoxymethyl acrylamide, t-butyl acrylamide sulfonic acid, vinyl stearate, N-methyl. acrylamide, N-dimethyl acrylamide, N-dimethylaminoethyl (meth)acrylate, N-dimethylaminopropyl acrylamide, acryloyl morpholine, glycidyl methacrylate, n-butyl methacrylate, ethyl methacrylate, allyl methacrylate, cetyl methacrylate, pentadecyl methacrylate, methoxypolyethylene glycol (meth)acrylate, diethylaminoethyl (meth)acrylate, methacryloyloxyethylsuccinic acid, hexanediol diacrylate, neopentyl glycol diacrylate, triethylene glycol diacrylate, polyethylene glycol diacrylate, polypropylene glycol diacrylate, neopentyl hydroxypivalic acid ester, pentaerythritol diacrylate monostearate, glycol diacrylate, 2-hydroxyethylmethacryloyl phosphate, bisphenol A ethylene glycol adduct acrylate, bisphenol F ethylene glycol adduct acrylate, tricyclodecanemethanol diacrylate, trishydroxyethyl isocyanurate diacrylate, 2-hydroxy-1-acryloxy-3-methacryloxypropane, trimethylolpropane triacrylate, trimethylolpropane ethylene glycol adduct triacrylate, trimethylolpropane propylene glycol adduct triacrylate, pentaerythritol triacrylate, trisacryloyloxyethyl phosphate, trishydroxyethyl isocyanurate triacrylate, modified ε-caprolactone triacrylate, trimethylolpropane ethoxy triacrylate, glycerol propylene glycol adduct triacrylate, pentaerythritol tetraacrylate, pentaerythritol ethylene glycol adduct tetraacrylate, ditrimethylolpropane tetraacrylate, dipentaerythritol hexa(penta)acrylate, dipentaerythritolmonohydroxy pentaacrylate, urethane acrylate, epoxy acrylate, polyester acrylate, unsaturated polyester acrylate and the like. These compounds may be used alone or as a mixture thereof, of which a multifunctional (meth)acrylate monomer or oligomer having two or more (meth)acryloyl groups in one molecule is preferred, because its coat film after polymerization is hard and has excellent scratch resistance. Ratio of these active energy ray polymerizable (meth)acrylate to the resin component in the heat wave blocking resin composition is preferably 10% by weight or more and 98% by weight or less, more preferably from 30 to 80% by weight.

In order to improve adhesiveness with films or compatibility of fine particles of an inorganic metal with the ultraviolet ray curable resin, an acrylic resin, a polyester resin, a butyral resin, a urethane resin or the like polymer may be used as a binder component which can be added as occasion demands in addition to the active energy ray polymerizable (meth)acrylate having (meth)acryloyl group. For example, Viron (a polyester resin manufactured by Toyobo Co.) can be used as the polyester resin, and Eslex manufactured by Sekisui Chemical Co. as the butyral resin. Particularly, a polymer having hydroxy group (a polyester resin, a butyral resin or the like for example, though not particularly limited to) is preferred, because dispersibility of fine particles of an inorganic metal becomes excellent and it simultaneously exerts actions to improve adhesiveness of ink and reduce shrinking of coated films. Ratio of this additional polymer to the resin component in the composition is preferably 3% by weight or more and 50% by weight or less, more preferably 20% by weight or less. When the amount of this polymer is too much, scratch resistance of the obtained film is reduced, so that it cannot be used in an application in which the coated side faces outside.

In order to disperse the fine particles of an inorganic metal thoroughly in the ultraviolet ray curable type resin, a dispersing agent may be added as occasion demands. Examples of the dispersing agent include anionic surface active agents of sulfuric ester, carboxylic acid, polycarboxylic acid and the like systems, cationic surface active agents such as a quaternary salt of a higher aliphatic amine and the like, nonionic surface active agents such as a higher fatty acid polyethylene glycol ester and the like, silicon base surface active agents, fluorine base surface active agents and high molecular active agents having amide ester bonds. Of these agents, when the inorganic metal is tin oxide, vanadium oxide, ATO, ITO or the like, dispersing agents of carboxylic acid and polycarboxylic acid systems are particularly preferred, and their examples include carboxylic acid base surface active agents such as R—COOH, $RSO_2NHCH_2COOH$, $RSCH_2COOH$, $RSOCH_2COOH$, $RCH_2COOH$, $RCH(SO_3H)COOH$ and the like sulfonic acid-carboxylic acid systems (R represents a saturated or unsaturated alkyl group having 10 to 20 carbon atoms) and polycarboxylic acid system surface active agents having a repeating unit of $—CH_2—CH(COOH)—$, $CH_2CH(CH_2COOH)—CH(Ph)—CH_2—$, $—CH(COOH)—CH(COOH)—C(CH_3)_2—CH_2—$, $—CH_2—CH(CH_2COOH)—$ or the like. Their illustrative examples include Floren AF-405, G-685, G-820 and the like (manufactured by Kyoei-sha Yushi Co.).

When the inorganic metal is zinc antimonate anhydride or its sol, various surface active agents can be used as the dispersing agent, and their preferred examples include a higher aliphatic amine quaternary salt, a polyethylene glycol alkylamine and the like cationic surface active agents, a higher fatty acid polyethylene glycol ester and the like nonionic surface active agents, amphoteric surface active agents, silicon base surface active agents, fluorine base surface active agents and high molecular active agents having amide ester bonds. The dispersing agent may be added in an amount of preferably 0.1% by weight or more and 15% by weight or less based on the total weight of the fine particles of an inorganic metal.

The resin composition of the present invention may further contain a compound having maximum absorption wave length at the near infrared region of 1,200 nm or less, such as a specified amino compound represented by a formula (1):

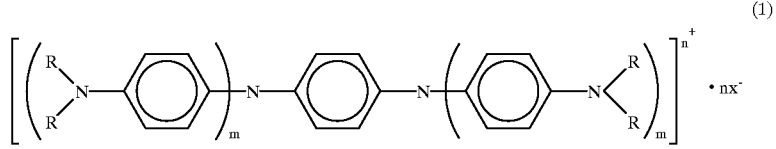

(1)

(in the formula, R represents H or an alkyl group having 1 to 12 carbon atoms, X represents $SbF_6$, $ClO_4$, Cl or Br, and each of m and n is 1 or 2).

It is said in general that the thermal energy contained in the sun light is divided into two almost equal parts of the visible light region and the infrared region having longer wave length. The present invention intends to absorb and block thermal energy of the infrared region efficiently, while improving visible light transmittance as large as possible. According to the present invention, it was found that excellent durability and effective absorption of solar radiation spectrum can be obtained when fine particles of an inorganic metal having thermal absorption ability are combined with a compound having maximum absorption wave length at the near infrared region of 1,200 nm or less, such as the amino compound of formula (1), so that more excellent solar radiation absorption ability is exerted and the visible light transmittance is also improved. A substance absorbing spectra through a broad range has not been found yet. At the same time, a coated film having excellent scratch resistance and durability can be formed efficiently, by the use of an active radiation ray curable type (meth) acrylate as a resin binding these solar radiation absorbing agents.

Typical examples of the compound having maximum absorption wave length at the near infrared region of 1,200 nm or less, to be used in the present invention, are amino compounds represented by the structure of formula (1) which have a maximum absorption wave length of about 750 nm or more and 1,200 nm or less. These compounds may be used alone or as a mixture as occasion demands. The amino compound can be applied to the present invention when made into fine particles of 0.5 μm or less, preferably 0.1 μm or less, in common with the case of the metal having solar radiation absorption ability, but it is more desirable to use it by dissolving in an organic solvent in view of its effects and easy preparation. The amino compound can be synthesized in accordance with the method disclosed in U.S. Pat. Nos. 3,484,467, 3,637,7769 or the like, and its examples include hexafluoroantimonic acid salt of bis(p-dibutylaminophenyl)-[p-N,N-bis(p-dibutylaminophenyl) aminophenyl]-aminium, N,N,N,N-tetrakis(p-dibutylaminophenyl)-1,4-benzeneiminium=dihexafluoroantimonate, N,N,N,N-tetrakis(p-dibutylaminophenyl)-1,4-benzeneiminium=diperchlorate and the like, though not particularly limited thereto. Ratio of the amino compound to the solid components of the resin composition can be selected at will depending on the required solar radiation blocking efficiency, but, in order to prevent reduction of visible ray transmittance, it may be within the range of preferably from 0.1% by weight to 50% by weight, more preferably from 0.5% by weight to 20% by weight.

The resin composition of the present invention may further contain a phthalocyanine compound represented by the following formula (2):

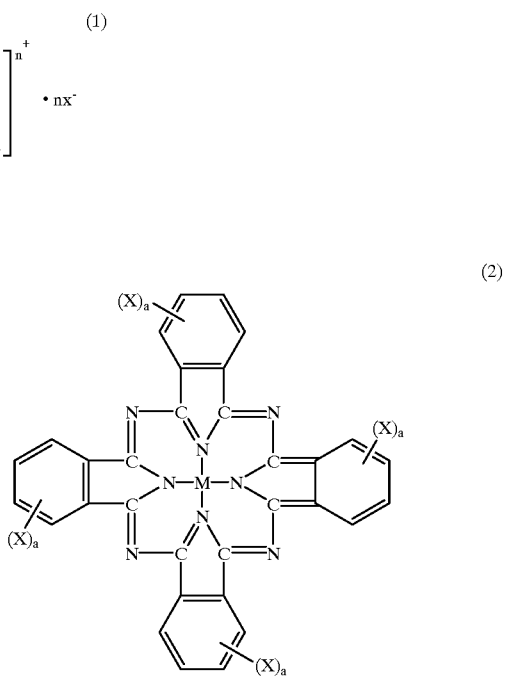

(2)

(in the formula, X independently represents hydrogen atom, a halogen atom, $—SR^1$, $—OR^2$ or $—NR^3R^4$; each of $R^1$ and $R^2$ independently represents phenyl group, benzyl group, naphthyl group, a cycloalkyl group, an alkyl group having 1 to 20 carbon atoms or an alkoxyl group, each of which may have a substituent group; each of $R^3$ and $R^4$ independently represents hydrogen atom, an alkyl group having 1 to 20 carbon atoms, a cycloalkyl group or phenyl group which may have a substituent group; a is an integer of 1 to 4; and M is non-metal (in that case, the formula (2) means a non-metal phthalocyanine), a metal, a metal oxide or a metal halide).

According to the present invention, excellent durability and broad absorption through wide range of solar radiation spectra can be obtained when the metal fine particles having solar radiation absorption ability are combined with the specified phthalocyanine compound, so that more excellent solar radiation absorption ability is exerted and, at the same time, a coated film having excellent scratch resistance and durability can be formed efficiently by the use of the active radiation ray curable type (meth)acrylate as a resin binding these solar radiation absorbing agents.

The specified phthalocyanine compound to be used in the present invention is represented by the structure of formula (2) and has a maximum absorption wave length of preferably 600 nm or more, more preferably 750 nm or more, from the viewpoint of improving visible light transmittance. In the formula (2), examples of the halogen atom include fluorine atom, chlorine atom, bromine atom and the like, examples of the central metal (M) include copper, zinc, iron, cobalt, titanium, vanadium, nickel, indium, tin and the like and examples of the metal halide include fluorides, chlorides, bromides, iodides and the like. When (M) is non-metal, it means for example two hydrogen atoms. Though many of phthalocyanine compounds are not soluble in solvents in general, those which are insoluble in solvents can be applied to the present invention when made into fine particles of 0.5 $\mu$m or less, preferably 0.1 $\mu$m or less, in common with the case of the metal having solar radiation absorption ability, but it is more desirable from the view point of easy preparation to select a phthalocyanine compound which is soluble in organic solvents. The phthalocyanine compound can be synthesized in accordance with the method disclosed for example in Japanese Patent Application Kokai No. 4-8771(1992), Japanese Patent Application Kokai No. 5-222047(1993), Japanese Patent Application Kokai No. 5-222302(1993), Japanese Patent Application Kokai No. 5-345861(1993) or Japanese Patent Application Kokai No. 6-25548(1994). Ratio of the phthalocyanine compound to the solid components of the resin composition can be selected at will depending on the required solar radiation blocking efficiency, but it may be within the range of preferably from 0.1 to 30% by weight, more preferably from 0.5 to 20% by weight.

When a film (coated film) is formed by exposing the resin composition of the present invention to ultraviolet ray, a photopolymerization initiator is used, and the photopolymerization initiator is dissolved in the resin composition in advance. As the photopolymerization initiator, any of various known compounds can be used with no particular limitation, and its amount to be used is 0.1 to 15% by weight, preferably 0.5 to 12% by weight relative to the resin composition, because curing ability is reduced when the amount is too small while strength of the cured film is reduced when it is too large. Illustrative examples of the photopolymerization initiator include Irgacure 184, Irgacure 651 (both manufactured by Ciba-Geigy Co.), Dalocure 1173 (manufactured by Merck Co.), benzophenone, methyl o-benzoylbenzoate, p-dimethyl benzoate, thioxanthone, alkylthioxanthone, amines and the like. Such initiators are not particularly required when curing polymerization is carried out using electron beams.

In addition, it is possible to add various slipping agents for the purpose of improving slipping properties of the surface of coated films, or to add an antifoaming agent with the aim of controlling bubbles which are generated when the composition is coated. Also, as occasion demands, various organic solvents such as toluene, xylene, ethyl acetate, alcohols, ketones and the like aromatic or aliphatic organic solvents may be added.

Production of the resin composition of the present invention and coating of the composition on films can be effected for example by the following methods.

A dispersion prepared in advance by dispersing fine particles of an inorganic metal of 0.5 $\mu$m or less in an organic solvent is mixed with a dispersion or solution of the specified amino compound or phthalocyanine compound represented by the aforementioned formula (1) or (2), respectively, as occasion demands, preferably further adding a small amount of a dispersing agent and a polymer to the mixture to effect stabilization of the dispersion. Thereafter, the solar radiation blocking resin composition of interest is obtained by adding one or a plurality of (meth)acrylate monomers or oligomers which can be polymerized by the irradiation of active radiation rays, if necessary by further dissolving an initiator. At this stage, appropriate amounts of a solvent and various additives can be added as occasion demands. The order of mixing each of these components is not particularly limited to the above order, with the proviso that the stabilization of the fine particles of the metal and amino compound or phthalocyanine compound can be achieved. The thus obtained composition is coated in one layer on a transparent film base and then active radiation rays such as ultraviolet rays or electron beams are irradiated, thereby a solar radiation blocking film having markedly high visible rays transmittance and excellent scratch resistance and solar radiation blocking efficiency being obtained. Alternatively, a similarly excellent solar radiation blocking film can be obtained by coating a resin composition containing fine particles of an inorganic metal and another resin composition containing an amino compound or a phthalocyanine compound on a film in two different layers or separately on both surfaces of the film. In that case, the amino compound or phthalocyanine compound of the aforementioned formula (1) or (2) is dispersed, preferably dissolved, in the aforementioned (meth)acrylate containing an additional binder polymer and/or an initiator and coated on one surface of a transparent film, and then a resin composition comprising fine particles of a metal and an additional binder polymer and/or the aforementioned (meth)acrylate is coated on the thus prepared layer or on the other surface of the film. When they are coated on both surfaces of a film, one surface may be a polymer which contains an adhesive. The coating of the composition on a film is carried out by a usual method such as dipping, gravure coating, offset coating, roll coating, bar coating, spraying or the like method, and the solvent is evaporated with hot air after the coating, subsequently irradiating active energy rays such as electron beams or ultraviolet rays when the coating composition contains a (meth)acrylate, thereby effecting instant polymerization and curing of the solar radiation blocking composition coated on the film surface. The paint film to be coated may have a thickness after drying of generally from 0.1 to 50 $\mu$m, preferably from 2 to 10 $\mu$m, from the viewpoint of preventing curling.

Examples of the film to be coated include polyester, polyethylene, polypropylene, polystyrene, polycarbonate, polyvinyl chloride, poly(meth)acryl, polyamide, polyurethane and the like, of which polyester is particularly preferred from the viewpoint of workability and strength. It is desirable that these film base materials have high transparency, but a colored film base material can also be used as occasion demands. Also useful are films on which metals (aluminum, chromium, copper, gold, silver and the like) are vacuum-deposited.

When the film base material is a vacuum-deposited film, it is desirable that the visible rays transmittance is 20% or more and 90% or less, preferably 40% or more and 80% or less, in view of the balance of solar radiation blocking efficiency with visible light transmittance. As occasion demands, a colored deposition film base may also be used. Aluminum, copper, gold, silver, chromium or the like may be used as the metal to be deposited on the film, though not particularly limited thereto with the proviso that it has an ability to block solar radiation. The metal deposited film can be obtained by vacuum deposition, sputtering or the like known method. In order to protect the metal deposited on the film, it may be further coated with a resin layer.

EXAMPLES

Next, preparation method of the resin composition of the present invention is described with reference to the following examples. Each adding ratio in the examples is % by weight.

Example 1

A container equipped with a stirrer is charged with 30 parts of dispersion of ATO (antimony doped tin oxide) having a primary particle size of 0.1 $\mu$m or less which are suspended in toluene to a solid content of 50%, and 6 parts of 3% toluene solution of a dispersing agent Floren AF-405 (a polycarboxylic acid base dispersing agent manufactured by Kyoei-sha Yushi Co.) is added thereto while thoroughly stirring. With stirring, to this is further added 20 parts of toluene. While thoroughly stirring, to this is added 7 parts of a polyester resin Bylon 24SS (manufactured by Toagosei Co.) in small portions. Subsequently, to this is added 20 parts of an ultraviolet ray curable resin dipentaerythritol hexaacrylate (KAYARAD DPHA, manufactured by Nippon Kayaku Co.) in small portions, while thoroughly stirring the contents. Finally, this is mixed with 1.4 parts of a photopolymerization initiator Irgacure 184, 0.1 part of a slipping agent SH-29PA (manufactured by San Nopco Co.) and 10 parts of toluene, and the mixture is stirred until the photopolymerization initiator is completely dissolved, thereby obtaining an ultraviolet ray curable type solar radiation blocking resin composition (1). This composition had a solid content of 41% and a viscosity of 11.7 cps and was dispersion-stable.

Example 2

The procedure of Example 1 was repeated, except that 6 parts of 3% solution of Floren G-820 was used as the dispersing agent, thereby obtaining a resin composition (2) having a solid content of 41% and a viscosity of 13.4 cps.

Example 3

The procedure of Example 1 was repeated, except that 10 parts of Viron 24SS was used as the polyester resin, thereby obtaining a resin composition (3) having a solid content of 41% and a viscosity of 11.5 cps.

Example 4

The procedure of Example 1 was repeated, except that 7 parts of Bylon 20SS was used as the polyester resin, thereby obtaining a resin composition (4).

Example 5

The procedure of Example 1 was repeated, except that 12 parts of 3% toluene solution of Floren G-405 was used as the dispersing agent, thereby obtaining a resin composition (5).

Example 6

The procedure of Example 1 was repeated, except that 50% dispersion of ITO (tin doped indium oxide) dispersed in toluene was used as the fine particles of an inorganic metal, thereby obtaining a resin composition (6).

Example 7

The procedure of Example 1 was repeated, except that 50% dispersion of tin oxide dispersed in toluene was used as the fine particles of an inorganic metal, thereby obtaining a resin composition (7).

Comparative Example 1

To 100 parts of 50% dispersion of ATO dispersed in toluene is added 6 parts of 3% solution of Floren G-820 as the dispersing agent, followed by thoroughly stirring. This was mixed with 100 parts of the polyester resin Bylon 20SS as a binder, and the mixture was thoroughly stirred to obtain a resin composition (8) having a solid content of 38.9%.

Comparative Example 2

To 100 parts of 50% dispersion of ATO dispersed in toluene is added 6 parts of 3% solution of Floren G-820 as the dispersing agent, followed by thoroughly stirring. This was mixed with 50 parts of an acrylic resin P-5109 (manufactured by Nippon Kayaku Co.) as a binder, and the mixture was thoroughly stirred to obtain a resin composition (9) having a solid content of 40.4%.

Comparative Example 3

The procedure of Comparative Example 1 was repeated, except that 50% dispersion of ITO dispersed in toluene was used, thereby obtaining a resin composition (10).

Comparative Example 4

The procedure of Comparative Example 2 was repeated, except that 50% dispersion of tin oxide dispersed in toluene was used, thereby obtaining a resin composition (11).

[Preparation of Coating Film]

(1) Each of the resin compositions obtained in Examples 1 to 7 and Comparative Examples 1 to 4 was coated on a polyester film of 50 microns in thickness using a coating bar, dried with hot air and then, in the case of the resin composition (1) to resin composition (7), cured by exposing it to ultraviolet rays with a high pressure mercury lamp of 80 W/cm at a conveyor speed of 20 m/min to obtain the coating film of interest. In the case of the resin compositions (8) to (11), each composition which is made into a coat by hot air drying was used as a coating film sample. Scratch resistance, transparency and near infrared spectral characteristics of the thus obtained films are shown in Table 1.

(2) FIG. 1 shows spectral characteristics of films (a), (b) and (c) obtained by coating the composition (3) of Example 3 in respective coating thicknesses of 2.7$\mu$, 3.5$\mu$ and 4.6$\mu$ on a polyester film of 50 microns in thickness, as well as of an un-coated polyester film (d). The film (b) showed a visible light transmittance of 83.6% and an absorption ratio of solar radiation of 0.23. The film (c) showed a visible rays transmittance of 80.0% and a absorption ratio of solar radiation of 0.27 (visible light transmittance was measured in accordance with the procedure of JIS A 5759, and absorption ratio of solar radiation was measured in accordance with the procedure of JIS R 3106).

Figure 2:
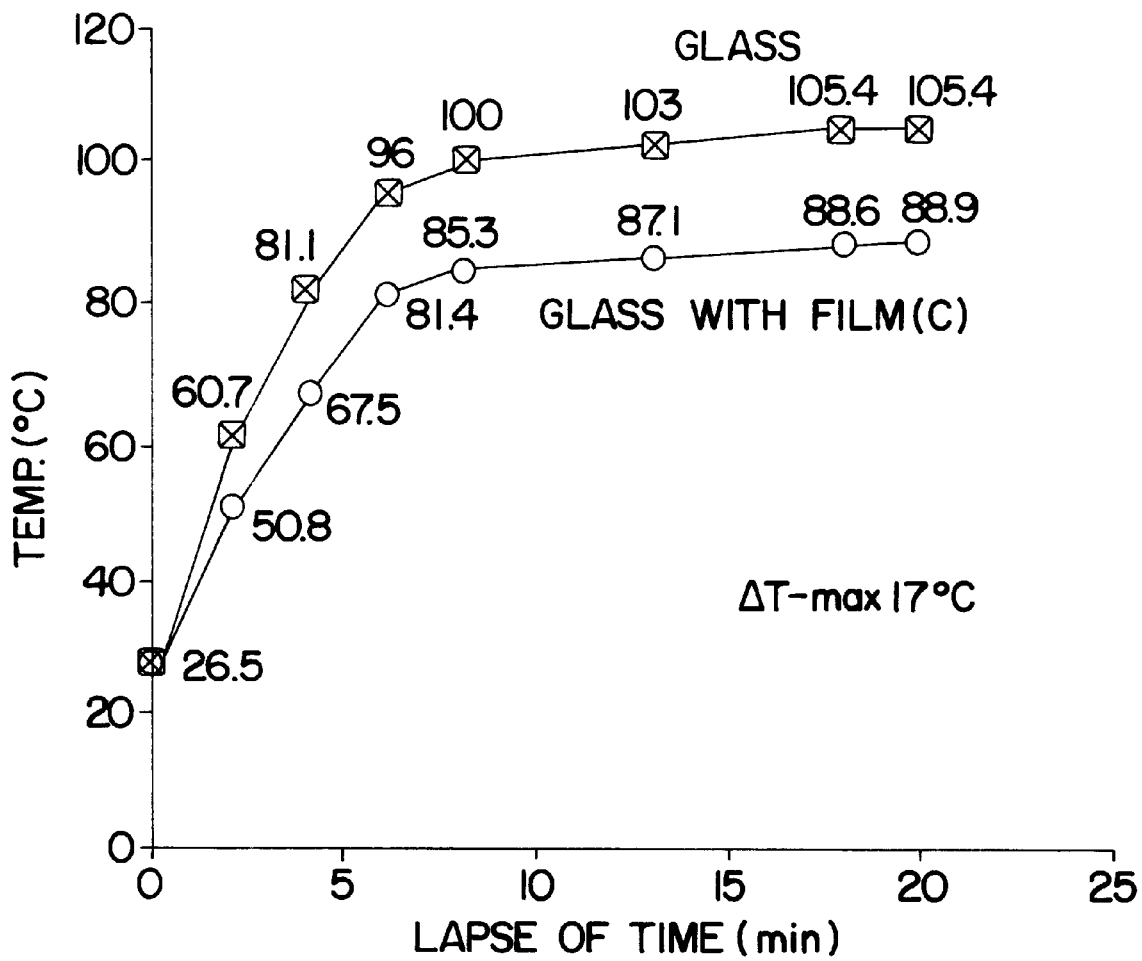
FIG. 2 is a graph showing solar radiation blocking characteristics of the polyester film (c) coated with the resin composition of the present invention.

(3) Five inner surfaces of a styrene foam container having a space volume of 20×20×20 cm was painted black, and the opening portion of one of two containers obtained in this manner was covered with a transparent glass plate (1.5 mm in thickness), and that of the other container with the same transparent glass plate but whose inner side has been laminated with the film (c) prepared fromthe composition of Example 3, to measure temperature rise curves inside the containers under direct sunlight (the weather: fine weather, 26.5° C. in atmospheric temperature). The results are shown in FIG. 2. Smaller temperature rise means superior solar radiation blocking efficiency.

TABLE 1

| Composition | Dispersion stability of composition | Physical properties of paint film coated on PET film | | |
| --- | --- | --- | --- | --- |
| | | Transparency | Scratch resistance | Pencil hardness |
| (1) | good | transparent | OO | 2 H |
| (2) | good | transparent | OO | 2 H |
| (3) | good | transparent | OO | 2 H |
| (4) | good | transparent | OO | 2 H |
| (5) | good | transparent | OO | 2 H |
| (6) | good | transparent | OO | 2 H |
| (7) | good | transparent | OO | 2 H |
| (8) | good | transparent | XX | B or less |
| (9) | good | transparent | XX | B or less |
| (10) | good | transparent | XX | B or less |
| (11) | good | transparent | XX | B or less |

OO: very good
XX: very bad

Example 8

Preparation of Composition A

A container equipped with a stirrer was charged with 50 parts of a toluene dispersion containing 50% of ATO having a primary particle size of 0.1 μm or less, and 7 parts of a polyester resin Bylon 24SS (manufactured by Toyobo Co.) was added in small portions to the dispersion while stirring. Subsequently, 18.5 parts of toluene and 22.4 parts of an ultraviolet ray curable type monomer of dipentaerythritol hexaacrylate (KAYARAD DPHA, manufactured by Nippon Kayaku Co.) were dissolved therein and then 2 parts of a photopolymerization initiator Irgacure 184 was dissolved, thereby obtaining an ultraviolet ray curable type resin composition A.

Preparation of Composition B

Six parts of N,N,N,N-tetrakis(p-dibutylaminophenyl)-1,4-benzeneiminium=dihexafluoroantimonate was dissolved in 60 parts of methyl ethyl ketone, subsequently dissolving 8.8 parts of dipentaerythritol hexaacrylate and 0.7 part of Irgacure 184, thereby obtaining an ultraviolet ray curable type resin composition B.

The composition A was mixed with the composition B at a ratio of 59.6:40.4, and the mixture was coated on a transparent polyester film to a thickness of 8.5 g/m², dried with hot air of 70° C. to evaporate the solvent and then exposed to ultraviolet rays with a high pressure mercury lamp of 80 W/cm at a conveyor speed of 20 m/min to effect polymerization curing of the coated film, thereby obtaining the solar radiation blocking coating film of interest.

Example 9

The composition B prepared in Example 8 was coated on a transparent polyester film to a dried thickness of 1.81 g/m², dried with hot air of 80° C. to evaporate the solvent and then exposed to ultraviolet rays with a high pressure mercury lamp of 80 W/cm at a conveyor speed of 25 m/min to effect curing of the coated film. Thereafter, the composition A was coated thereon to a dried thickness of 6.7 g/m², dried and then exposed to ultraviolet rays under the same conditions to effect polymerization curing of the coated film, thereby obtaining the solar radiation blocking coating film of interest.

Example 10

Preparation of Composition C

In 50 parts of methyl ethyl ketone was dissolved 0.2 part of N,N,N,N-tetrakis(p-dibutylaminophenyl)-1,4-benzeneiminium=dihexafluoroantimonate, subsequently mixing and dissolving 150 parts of an acrylic adhesive containing 80% of ethyl acetate, thereby obtaining an adhesive composition C.

The composition A was coated on one surface of a transparent polyester film to a dried thickness of 6.7 g/m², dried with hot air of 70° C. to evaporate the solvent and then exposed to ultraviolet rays of a high pressure mercury lamp of 80 W/cm at a conveyor speed of 20 m/min to effect curing of the paint film. The adhesive composition C containing the amino compound was coated on the opposite surface of the film to a dried thickness of 21.1 g/m² and then dried with hot air of 80° C. to obtain a solar radiation blocking coating film having an adhesive.

Comparative Example 5

The composition B alone was coated on a transparent polyester film to a dry weight of 0.36 g/m², dried at 70° C. and then subjected to ultraviolet ray curing in the same manner as described in Example 10 to obtain a solar radiation blocking coating film.

To be used as reference, tests were carried out on a commercially available film for car in which aluminum has been deposited on a PET film using a vacuum metal sputtering apparatus or another commercially available film for use in the same purpose which has been colored in black with an organic pigment. Characteristic properties of the thus obtained films are shown in Table 2, FIG. 3 and FIG. 4.

TABLE 2

| | Amounts of solar radiation absorbents on PET film | | Characteristic properties when coated on transparent PET film | | |
| --- | --- | --- | --- | --- | --- |
| | Amino compound g/m² | ATO g/m² | Visible light transmittance (%) | Absorption ratio of solar radiation | Scratch resistance (surface) |
| Ex. 8 | 0.7 | 3.25 | 62.02 | 0.59 | O |
| Ex. 9 | 0.7 | 3.25 | 59.99 | 0.59 | O |
| Ex. 10 | 0.14 | 3.25 | 67.82 | 0.35 | O |
| Comp. Ex. 5 | 0.14 | — | 83.42 | 0.18 | O |
| Al deposited film | — | — | 30.40 | 0.40 | X |
| Colored film | — | — | 21.02 | 0.35 | X |

Figure 3:
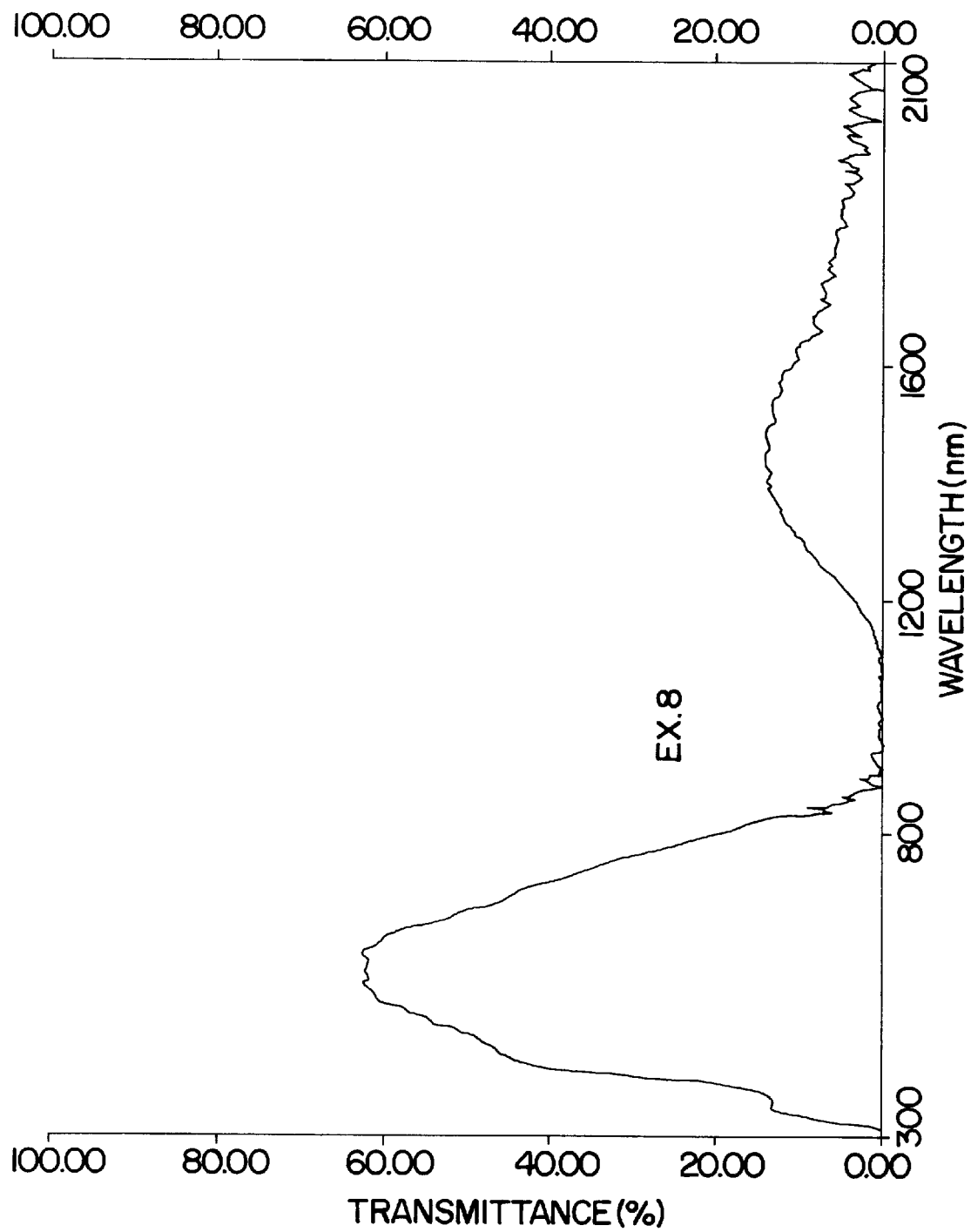
FIG. 3 is a graph showing spectral characteristics of the film of the present invention (Example 8).
Figure 4:
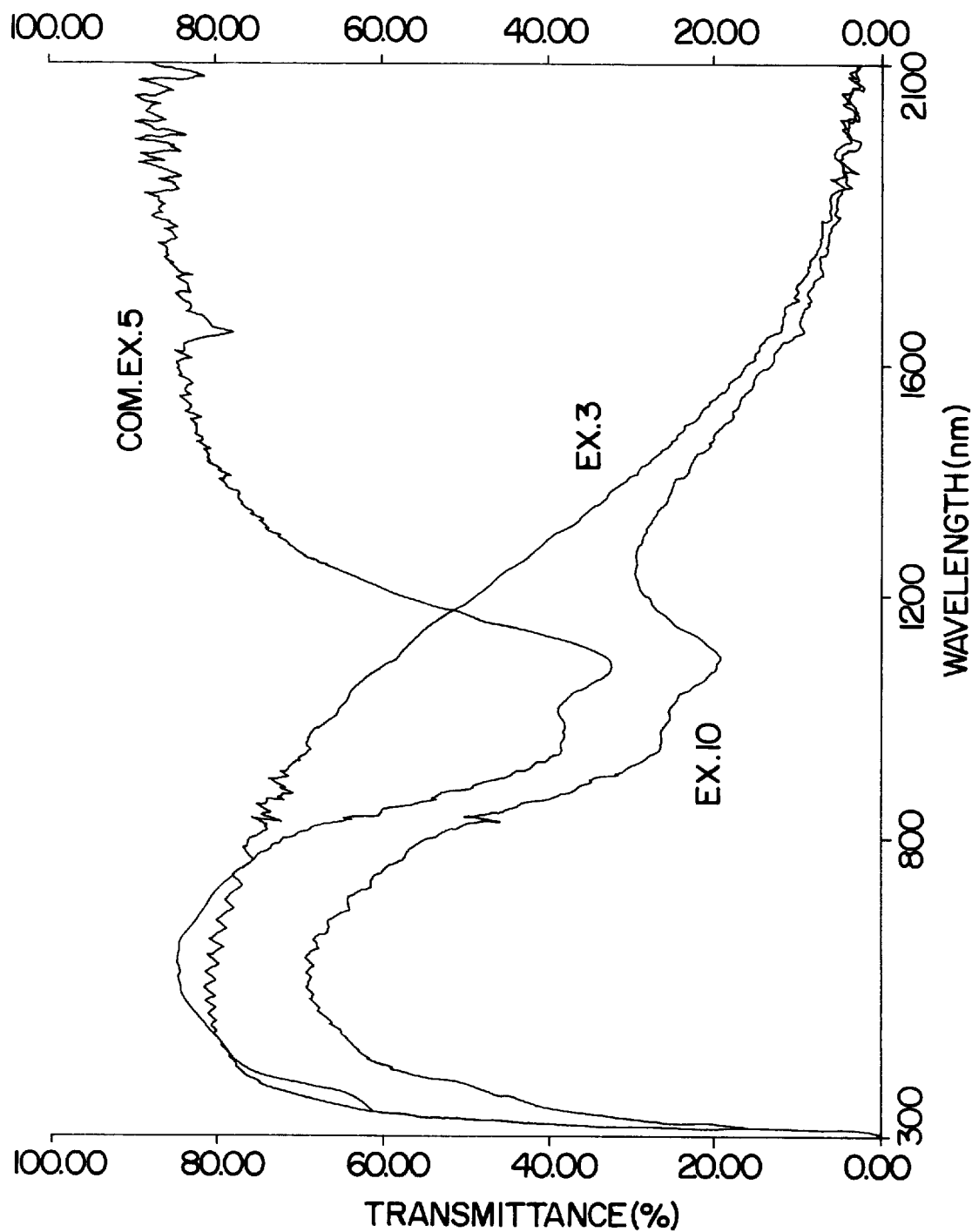
FIG. 4 is a graph showing spectral characteristics of the films of the present invention (Examples 3 and 10) and of the film of Comparative Example 5.

Visible light transmittance was measured in accordance with the procedure of JIS A 5759.
Absorption ratio of solar radiation was measured in accordance with the procedure of JIS R 3106.
(Absorption ratio of solar radiation having larger value means superior solar radiation blocking efficiency.)
Scratch resistance was measured using steel wool # 0000 under a load of 200 g with 20 reciprocals.
O: completely no scratches
X: presence of scratches As shown in FIG. 3 and FIG. 4, a solar radiation blocking film having its absorption spectrum broadly ranging from the near infrared to far infrared can be obtained when an amino compound having its absorption only at the near infrared region is combined with a metal having its absorption at the far infrared region. A material which absorbs solar radiation within such a broad range of spectrum has not been found yet.

Example 11

A container equipped with a stirrer was charged with 50 parts of toluene dispersion containing 50% of ATO having a primary particle size of 0.1 μm or less, and 6 parts of toluene solution containing 3% of a dispersing agent Floren AF-405 (a polycarboxylic acid base dispersing agent manufactured by Kyoei-sha Yushi Co.) was added thereto while thoroughly stirring. Next, 13.5 parts of a toluene solution prepared by dissolving 1 part of a toluene-soluble phthalocyanine compound (EX Color 803K, manufactured by Nippon Shokubai Co.) was added and then, while continuing the stirring, 7 parts of a polyester resin Bylon 24SS (manufactured by Toyobo Co.) was added and dissolved in small portions. Subsequently, 21.5 parts of an ultraviolet ray curable type monomer of dipentaerythritol hexaacrylate (KAYARAD DPHA, manufactured by Nippon Kayaku Co.) and 2 parts of a photopolymerization initiator Irgacure 184 were added thereto and dissolved therein in that order, thereby obtaining an ultraviolet ray curable type, solar radiation blocking resin composition (12). This composition had a solid content of 51.5% and a viscosity of 15 cps and the dispersibility was stable.

Example 12

In Example 11, 14.5 parts of toluene solution containing 2 parts of EX Color 803K, namely doubled amount of the phthalocyanine compound, was used and the amount of dipentaerythritol hexaacrylate was changed to 20.5 parts in order to adjust the solid content, and the procedure of Example 11 was repeated to obtain a solar radiation blocking resin composition (13). In common with the case of Example 11, this composition had a solid content of 51.5% and a viscosity of 16 cps and the dispersibility was stable.

Comparative Example 6

A solar radiation blocking resin composition (14) containing no metal fine particles of ATO but comprising a phthalocyanine compound only was obtained in the following manner. A container equipped with a stirrer was charged with 20 parts of toluene, in which, while thoroughly stirring, was subsequently dissolved 0.3 part of a phthalocyanine compound EX Color 803K. Subsequently, 19 parts of dipentaerythritol hexaacrylate and 1 part of a photopolymerization initiator Irgacure 184 were added thereto and completely dissolved therein in that order, thereby obtaining an ultraviolet ray curable type solar radiation blocking resin composition.

Comparative Example 7

A solar radiation blocking resin composition (15) comprising a phthalocyanine compound only was obtained in the following manner by repeating the procedure of Comparative Example 6, except that the amount of the phthalocyanine compound was doubled. A container equipped with a stirrer was charged with 20 parts of toluene, in which, while thoroughly stirring, was subsequently dissolved 0.6 part of the phthalocyanine compound EX Color 803K. Subsequently, 18.7 parts of dipentaerythritol hexaacrylate and 1 part of the photopolymerization initiator Irgacure 184 were added thereto and completely dissolved therein in that order, thereby obtaining an ultraviolet ray curable type, solar radiation blocking resin composition.

[Preparation of coating film]

Each of the solar radiation blocking resin compositions obtained in Examples 11 and 12 was coated on a transparent polyester film of 50 μm in thickness using a wire bar in such an amount that the applied amount of the solid contents became 6.7 g/m², and in the same manner, each of the compositions of Comparative Example 6 and 7 was coated using a wire bar to an application amount of 8.8 g/m², and the thus coated films were dried with hot air of 80° C. to evaporate the solvent and then exposed to a high pressure mercury lamp of 80 W/cm at a conveyor speed of 20 m/min to effect polymerization curing of the films, thereby obtaining the solar radiation blocking coating films of interest. Also, to be used as reference, a commercially available film for car windows in which aluminum has been deposited on a PET film using a vacuum metal sputtering apparatus and another commercially available film for use in the same purpose which has been colored in black with an organic pigment were subjected to the tests. Characteristic properties of the thus obtained films are shown in Table 3.

TABLE 3

| | Amounts of solar radiation absorbents on PET film | | Characteristic properties when coated on transparent PET film | | |
|---|---|---|---|---|---|
| | | | Absorption | | |
| | Phthalo-cyanine g/m² | ATO g/m² | Visible light transmittance (%) | ratio of solar radiation | Scratch resistance (surface) |
| Ex. 11 | 0.13 | 3.25 | 62.03 | 0.43 | O |
| Ex. 12 | 0.26 | 3.25 | 49.87 | 0.55 | O |
| Comp. Ex. 6 | 0.13 | — | 68.60 | 0.24 | O |
| Comp. Ex. 7 | 0.26 | — | 55.45 | 0.37 | O |
| Al deposited film | — | — | 30.40 | 0.40 | X |
| Colored film | — | — | 21.02 | 0.35 | X |

Visible light transmittance was measured in accordance with the procedure of JIS A 5759.
Absorption ratio of solar radiation was measured in accordance with the procedure of JIS R 3106.
(Absorption ratio of solar radiation having larger value means superior solar radiation blocking efficiency.)
Scratch resistance was measured using steel wool # 0000 under a load of 200 g with 20 reciprocals.
O: completely no scratches
X: presence of scratches As is evident from Table 3, visible light transmittance values of Examples 11 and 12 are close to those of Comparative Examples 6 and 7, but values of the absorption ratio of solar radiation which represent actual heat wave blocking capacity are considerably larger than those of Comparative Examples 6 and 7, so that the films of the invention are excellent in solar radiation blocking efficiency. This indicates that, at the same visible light transmittance, the solar radiation blocking efficiency is synergistically improved in combination of the specified phthalocyanine compound with ATO (an example of the inorganic metal). In addition, in comparison with the deposition and colored films which are commercially available generally as solar radiation cutting films and used herein as reference, the films of Examples 11 and 12 can show much higher solar radiation blocking efficiency while keeping high visible light transmittance.

Example 13

Preparation of Solution (D)

A container equipped with a stirrer was charged with 50 parts of methanol solution containing 40% of sol of zinc antimonate anhydride ($ZnSb_2O_6$) having a particle size of 0.1 $\mu$m or less, and 3.5 parts of a dispersing agent Pluronic TR-702 (manufactured by Asahi Denka Kogyo Co.) was added to the solution, which was thoroughly stirred.

Preparation of Solution (E)

While stirring, 30 parts of toluene was added to 64 parts of an ultraviolet ray curable resin dipentaerythritol hexaacrylate (KAYARAD DPHA, manufactured by Nippon Kayaku Co.), subsequently adding 0.6 part of a photopolymerization initiator Irgacure 184 and 0.05 part of a slipping agent SH-29PA (manufactured by San Nopco Co.), and the resulting mixture was stirred until the photopolymerization initiator was completely dissolved.

While thoroughly stirring, 30 parts of the solution (E) was gradually added to the solution (D), thereby obtaining an ultraviolet ray curable type, solar radiation blocking resin composition (16).

Example 14

A resin composition (17) was obtained in the same manner as described in Example 13, except that Adekacol CC-42 (manufactured by Asahi Denka Kogyo Co.) was used as the dispersing agent. Example 15

A resin composition (18) was obtained in the same manner as described in Example 13, except that 40 parts of the solution (E) was used.

Comparative Example 8

3.5 parts of Pluronic TR-702 as a dispersing agent is added to 50 parts of methanol solution containing 40% of sol of zinc antimonate anhydride prepared by dispersing in toluene and having a particle size of 0.1 $\mu$m or less, and the mixture is thoroughly stirred. Thereafter, a resin composition (19) was obtained by adding 30 parts of methanol solution containing 30% of a butyral resin Eslec BX-L (manufactured by Sekisui Chemical Co.) as a binder.

Preparation of Coating Film

Each of the resin compositions obtained in Examples 13 to 15 and Comparative Example 8 was coated on a transparent polyester film of 50 $\mu$m in thickness using a coating bar to a solid content thickness of 4.1 $\mu$m dried with hot air to evaporate the solvent and then, in the case of the resin composition (16) to resin composition (18), cured by exposing it to ultraviolet rays with a high pressure mercury lamp of 80 W/cm at a conveyor speed of 20 m/min. to obtain the coating film of interest. In the case of the resin composition (19), it was used as the coated film sample after coated and dried by hot air.

Figure 5:
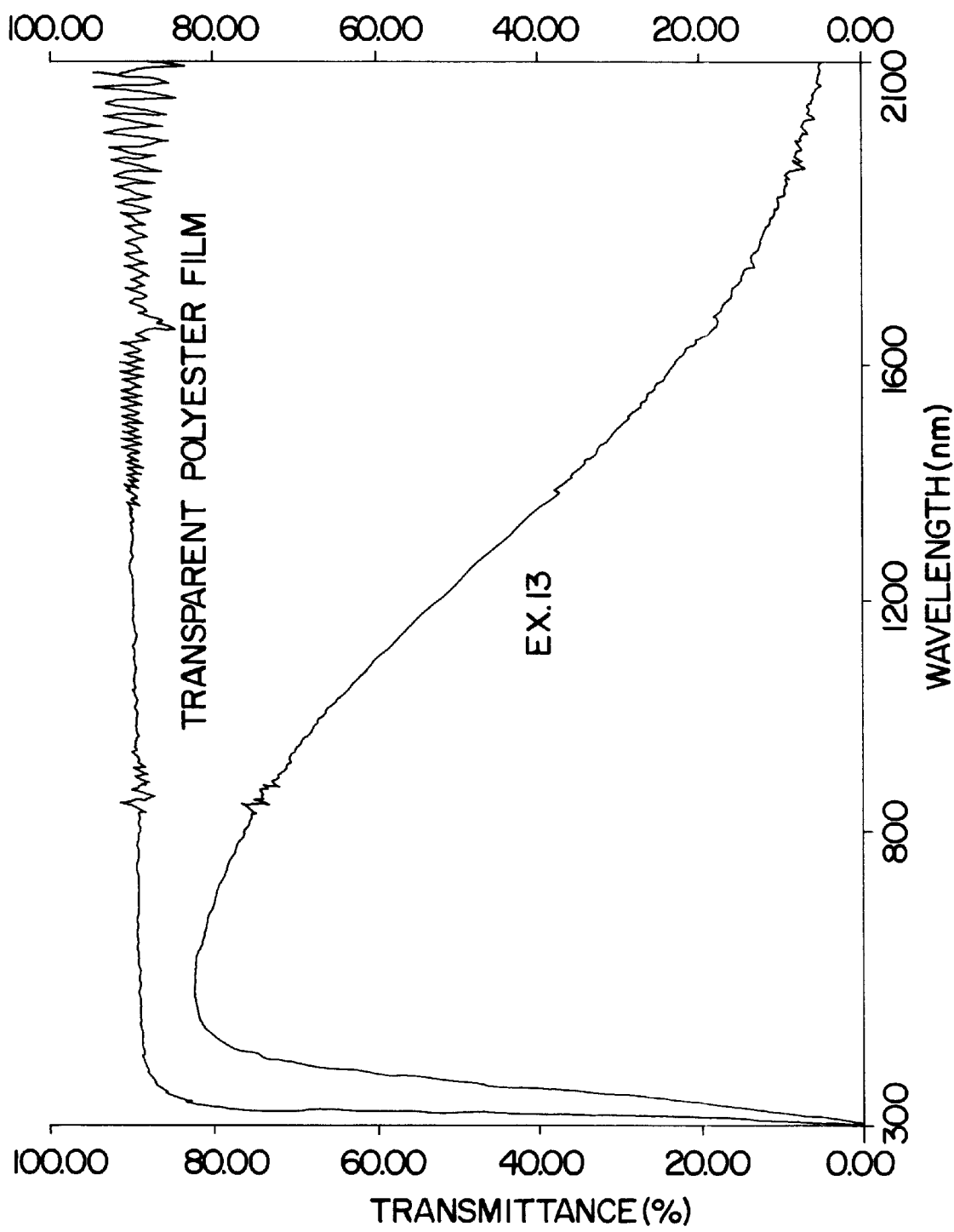
FIG. 5 is a graph showing spectral characteristics of the film of the present invention (Example 13) and of an un-coated transparent polyester film.

Also, to be used as a reference, the transparent polyester film of 50 microns in thickness without any coating was subjected to the test. Characteristic properties of the obtained films are shown in Table 4, and their spectral characteristics are shown in FIG. 5.

TABLE 4

| | Characteristics values when coated on transparent PET film | | | |
|---|---|---|---|---|
| Composition | Transparency | Pencil hardness (surface) | Visible light transmittance (%) | Absorption ratio of solar radiation |
| 16 | transparent | 2 H | 80.0 | 0.27 |
| 17 | transparent | 2 H | 80.0 | 0.27 |
| 18 | transparent | 2 H | 84.0 | 0.20 |
| 19 | transparent | B or less | 78.0 | 0.30 |
| Transparent polyester film | transparent | B or less | 88.9 | 0.01 |

Visible light transmittance was measured in accordance with the procedure of JIS A 5759.
Absorption ratio of solar radiation was measured in accordance with the procedure of JIS R 3106.
(Absorption ratio of solar radiation having larger value means superior solar radiation blocking efficiency.)

Example 16

A container equipped with a stirrer was charged with 50 parts of a toluene dispersion containing 50% of ATO having a primary particle size of 0.1 $\mu$m or less, and 6 parts of a toluene solution containing 3% of a dispersing agent Floren AF-405 (a polycarboxylic acid base dispersing agent manufactured by Kyoei-sha Yushi Co.) was added to the dispersion which was thoroughly stirred. While continuing the stirring, in this was dissolved 7 parts of a polyester resin Bylon 24SS by adding it in small portions. Subsequently, 12.5 parts of toluene and 22.5 parts of an ultraviolet ray curable type monomer of dipentaerythritol hexaacrylate were added thereto and dissolved therein and then 2 parts of a photopolymerization initiator Irgacure 184 was dissolved in the resulting solution, thereby obtaining an ultraviolet ray curable type solar radiation blocking paint. The thus obtained ultraviolet ray curable type solar radiation blocking paint was coated on the surface opposite to the surface of a deposited film having a visible light transmittance of 56%, prepared by depositing aluminum on a transparent polyester film of 50$\mu$ in thickness, using a wire bar in such an amount that the applied amount of the solid content became 6.7 g/m$^2$. This was dried with hot air of 80° C. to evaporate the solvent and then exposed to ultraviolet light of a high pressure mercury lamp of 80 W/cm at a conveyor speed of 20 m/min to effect polymerization curing of the paint film, thereby obtaining the solar radiation blocking coating film of interest.

Example 17

A solar radiation blocking paint was obtained in the same manner as described in Example 16, except that the same amount of zinc antimonate anhydride gel was used in stead of ATO. The thus obtained solar radiation blocking paint was coated on the surface of a deposition film having a visible light transmittance of 56%, which has been prepared by depositing aluminum on a transparent polyester film of 25$\mu$ in thickness, using a wire bar in such an amount that the applied amount of the solid content became 6.7 g/m$^2$. This was dried with hot air of 80° C. to evaporate the solvent and then exposed to ultraviolet light of a high pressure mercury lamp of 80 W/cm at a conveyor speed of 20 m/min to effect polymerization curing of the paint film, thereby obtaining the solar radiation blocking coating film of interest.

Also, to be used as reference, the deposition film itself used in Example 16 and a commercially available film for car which has been colored in black with an organic pigment were subjected to the tests. Characteristic properties of the thus obtained films are shown in Table 5.

TABLE 5

| | Characteristics values when coated on transparent PET film | | |
|---|---|---|---|
| | Visible light transmittance % | Absorption ratio of solar radiation | Scratch resistance |
| Example 16 | 50.11 | 0.39 | O |
| Example 17 | 49.87 | 0.40 | O |
| Deposition film | 56.08 | 0.29 | X |
| Colored film | 21.02 | 0.35 | X |

Visible light transmittance was measured in accordance with the procedure of JIS A 5759.
Absorption ratio of solar radiation was measured in accordance with the procedure of JIS R 3106.
(Absorption ratio of solar radiation having larger value means superior solar radiation blocking efficiency.)
Scratch resistance was measured using steel wool # 0000 under a load of 200 g with 20 reciprocals.
O: completely no scratches
X: presence of scratches

INDUSTRIAL APPLICABILITY

The active radiation ray curable type, solar radiation blocking risin composition of the present invention has high transmittance at the visible light region, is transparent and can be formed easily into a coated film having excellent scratch resistance by the irradiation of active energy rays, so that it can be applied most suitably to building windows, car windows and the like as a solar radiation blocking film.

What is claimed is:

1. A solar radiation blocking resin composition curable with active radiation rays, which comprises (1) fine particles of zinc antimonate anhydride having solar radiation absorption ability which are prepared in such a form that they are dispersed in organic solvents and have a primary particle size of 0.5 µm or less, (2) a nonionic surface active agent having weak cationic activity and (3) a binder containing an active radiation ray polymerizable (meth)acrylate having a (meth)acryloyl group as an essential binder.

2. A film in which the resin composition of claim 1 is coated on a film base.

3. The film according to claim 2 wherein the film base is a transparent or colored film of polyester, polycarbonate or polyurethane, polyvinyl chloride or poly(meth)acryl or one of these films on which aluminum is deposited.

* * * * *